United States Patent
Siu et al.

(10) Patent No.: US 12,209,914 B2
(45) Date of Patent: Jan. 28, 2025

(54) TEMPERATURE SENSOR FITTING

(71) Applicant: Breville Pty Limited, Alexandria (AU)

(72) Inventors: Eddie Siu, New South Wales (AU); Richard Llewelyn Jones, Alexandria (AU); Warren Preston, Alexandria (AU); Con Psarlogos, Alexandria (AU)

(73) Assignee: BREVILLE PTY LIMITED, Alexandria (AU)

(*) Notice: Subject to any disclaimer, the term of this patent is extended or adjusted under 35 U.S.C. 154(b) by 574 days.

(21) Appl. No.: 17/616,458

(22) PCT Filed: Jun. 26, 2020

(86) PCT No.: PCT/AU2020/050657
§ 371 (c)(1),
(2) Date: Dec. 3, 2021

(87) PCT Pub. No.: WO2020/257868
PCT Pub. Date: Dec. 30, 2020

(65) Prior Publication Data
US 2022/0326089 A1 Oct. 13, 2022

(30) Foreign Application Priority Data
Jun. 27, 2019 (AU) .................. 2019902250

(51) Int. Cl.
*G01K 1/14* (2021.01)
*G01K 7/22* (2006.01)
*A47J 27/21* (2006.01)

(52) U.S. Cl.
CPC ............... *G01K 1/14* (2013.01); *G01K 7/223* (2013.01); *A47J 27/21166* (2013.01); *A47J 2202/00* (2013.01); *G01K 2207/06* (2013.01)

(58) Field of Classification Search
None
See application file for complete search history.

(56) References Cited

U.S. PATENT DOCUMENTS

| 4,812,624 A | 3/1989 | Kern |
| 6,224,678 B1* | 5/2001 | Ramos ............... G01K 1/14 |
| | | 118/724 |

(Continued)

FOREIGN PATENT DOCUMENTS

| CN | 203564080 U | 4/2014 |
| CN | 207041424 U | 2/2018 |

(Continued)

OTHER PUBLICATIONS

CN 109649884 A (Wang, Xu-Dong et al.) Apr. 19, 2019 [retrieved on Jun. 29, 2024]. Retrieved from Foreign Image and Text database, translation by Clarivate Analytics. (Year: 2019).*

(Continued)

*Primary Examiner* — John J Norton
(74) *Attorney, Agent, or Firm* — Tarolli, Sundheim, Covell & Tummino LLP (57) ABSTRACT

A temperature sensor fitting for use with a temperature sensor that detects the temperature of ingredients that are inside a heating vessel of a kitchen device, the temperature sensor fitting comprising: a collar comprising an inner threaded portion; a PTFE insulator comprising an outer threaded portion that corresponds with the inner threaded portion of the collar, and further comprises an inner threaded portion; a metal cap comprising an outer threaded portion that corresponds with the inner threaded portion of the PTFE insulator; wherein the PTFE insulator provides thermal isolation between a temperature sensor and a heating plate of the kitchen device; and wherein the collar comprises an outer surface that corresponds with an edge of a floor of a heating vessel of a kitchen device and the outer surface is suitable for welding to the edge of the floor to form a weld seal.

17 Claims, 7 Drawing Sheets

(56) References Cited

U.S. PATENT DOCUMENTS

2017/0142780 A1    5/2017  Hoare et al.
2018/0003655 A1*   1/2018  Rud .......................... G01K 1/08
2018/0206677 A1    7/2018  Ivarsson et al.

FOREIGN PATENT DOCUMENTS

| CN | 207755097 U   |   | 8/2018 |           |
|----|---------------|---|--------|-----------|
| CN | 109649884 A   | * | 4/2019 | B65D 90/48 |
| CN | 208957797 U   |   | 6/2019 |           |
| JP | 2009092395 A  |   | 4/2009 |           |
| KR | 20180010784 A |   | 1/2018 |           |

OTHER PUBLICATIONS

International Search Report for application No. PCT/AU2020/050657 mailing date Aug. 17, 2020.
Extended European Search Report issued in connection with corresponding European Application No. 20831996.2 mailed on Oct. 28, 2022.
CN Office Action for corresponding CN Application No. 202080043382.X, issued Dec. 14, 2023, 9 pgs.

* cited by examiner

TEMPERATURE SENSOR FITTING

TECHNICAL FIELD

The present invention relates generally to a temperature sensor fitting and, in particular, to a temperature sensor fitting for use with a temperature sensor that detects the temperature of ingredients that are inside a heating vessel of a kitchen device.

BACKGROUND

Temperature sensors are used in kitchen devices for monitoring temperatures during the cooking process.

Current arrangements of temperature sensors may not provide sufficiently accurate temperature readings to provide accurate control of the cooking process.

Further, current arrangements of temperature sensors may not provide sufficient liquid isolation when the kitchen device is being cleaned causing damage to the temperature sensor.

For example, kitchen devices (or machines) performing a variety of stirring, processing, blending and/or heating of ingredients have become popular in the consumer and commercial markets. One such kitchen device may be a multicooker, for example. The popularity of multicookers is partly due to their ability to cook many different types of meals using a number of different cooking processes with minimum interaction from the user. In order to do this, known kitchen devices may measure the temperature of the heating billet used to cook the food.

However, some cooking processes may not be accurately temperature monitored within the kitchen device in order to enable the cooking processes to be controlled by the kitchen device accurately. This may result in reduced quality meals being produced by the kitchen device following the cooking process.

Currently, kitchen devices in the market use temperature sensor(s) that measure the temperature of the heating element, and this measured temperature is assumed to be the temperature at which the ingredients are being cooked, which may affect the actual cooking process both in terms of power delivered and cooking time.

SUMMARY

It is an object of the present invention to substantially overcome, or at least ameliorate, one or more disadvantages of existing arrangements.

Disclosed are arrangements which seek to address the above problems by providing an improved temperature sensor fitting. The temperature sensor fitting has one or more of a weld seal for attachment to a heating vessel, a PTFE seal to isolate the temperature sensor and a silicon seal to isolate the temperature sensor.

According to a first aspect of the present disclosure, there is provided a temperature sensor fitting for use with a temperature sensor that detects the temperature of ingredients that are inside a heating vessel of a kitchen device, the temperature sensor fitting comprising: a collar comprising an inner threaded portion; a PTFE insulator comprising an outer threaded portion that corresponds with the inner threaded portion of the collar, and further comprises an inner threaded portion; a metal cap comprising an outer threaded portion that corresponds with the inner threaded portion of the PTFE insulator; wherein the PTFE insulator provides thermal isolation between a temperature sensor and a heating plate of the kitchen device; and wherein the collar comprises an outer surface that corresponds with an edge of a floor of a heating vessel of a kitchen device and the outer surface is suitable for welding to the edge of the floor to form a weld seal.

The temperature sensor fitting may have an outer silicone seal comprising an annular cavity, wherein the annular cavity is arranged to encase the collar, the PTFE insulator and the metal cap.

The temperature sensor fitting may have an O-ring arranged around the PTFE insulator, and be arranged in between the PTFE insulator and the collar.

The temperature sensor fitting may have a temperature sensor, wherein the temperature sensor is arranged to be in thermal contact with the metal cap.

The temperature sensor fitting may have a temperature sensor, wherein the temperature sensor is a glass NTC bead and the glass NTC bead is potted directly onto the metal cap.

The temperature sensor fitting may have a metal cap that has an inner surface against which the temperature sensor is in thermal contact and an outer surface that opposes the inner surface, where the outer surface of the metal cap is arranged to be in contact with the ingredients.

The temperature sensor fitting may have a metal cap that is made from stainless steel.

The temperature sensor fitting may have an outer surface of the collar that is suitable for laser welding to the edge of the floor.

The temperature sensor fitting may have a collar that is made from stainless steel.

The temperature sensor fitting may have a locking collar arranged to prevent the metal cap from unscrewing.

The temperature sensor fitting may have a locking collar arranged to encase the collar, the PTFE insulator and the metal cap.

The temperature sensor fitting may have two or more of the inner or outer threaded portions of the collar, the PTFE insulator and the metal cap formed as taper lock threads.

The temperature sensor fitting may have one or more additional sealants between two or more of the threaded portions of the collar, the PTFE insulator and the metal cap.

A kitchen device is disclosed that has a temperature sensor fitting according to any one of the above arrangements, wherein the collar of the temperature sensor fitting is laser welded to the edge of the floor of the heating vessel of the kitchen device.

Other aspects are also disclosed.

BRIEF DESCRIPTION OF THE DRAWINGS

At least one embodiment of the present invention will now be described with reference to the drawings and appendices, in which.

DETAILED DESCRIPTION INCLUDING BEST MODE

Where reference is made in any one or more of the accompanying drawings to steps and/or features, which have the same reference numerals, those steps and/or features have for the purposes of this description the same function(s) or operation(s), unless the contrary intention appears.

Figure 1A:
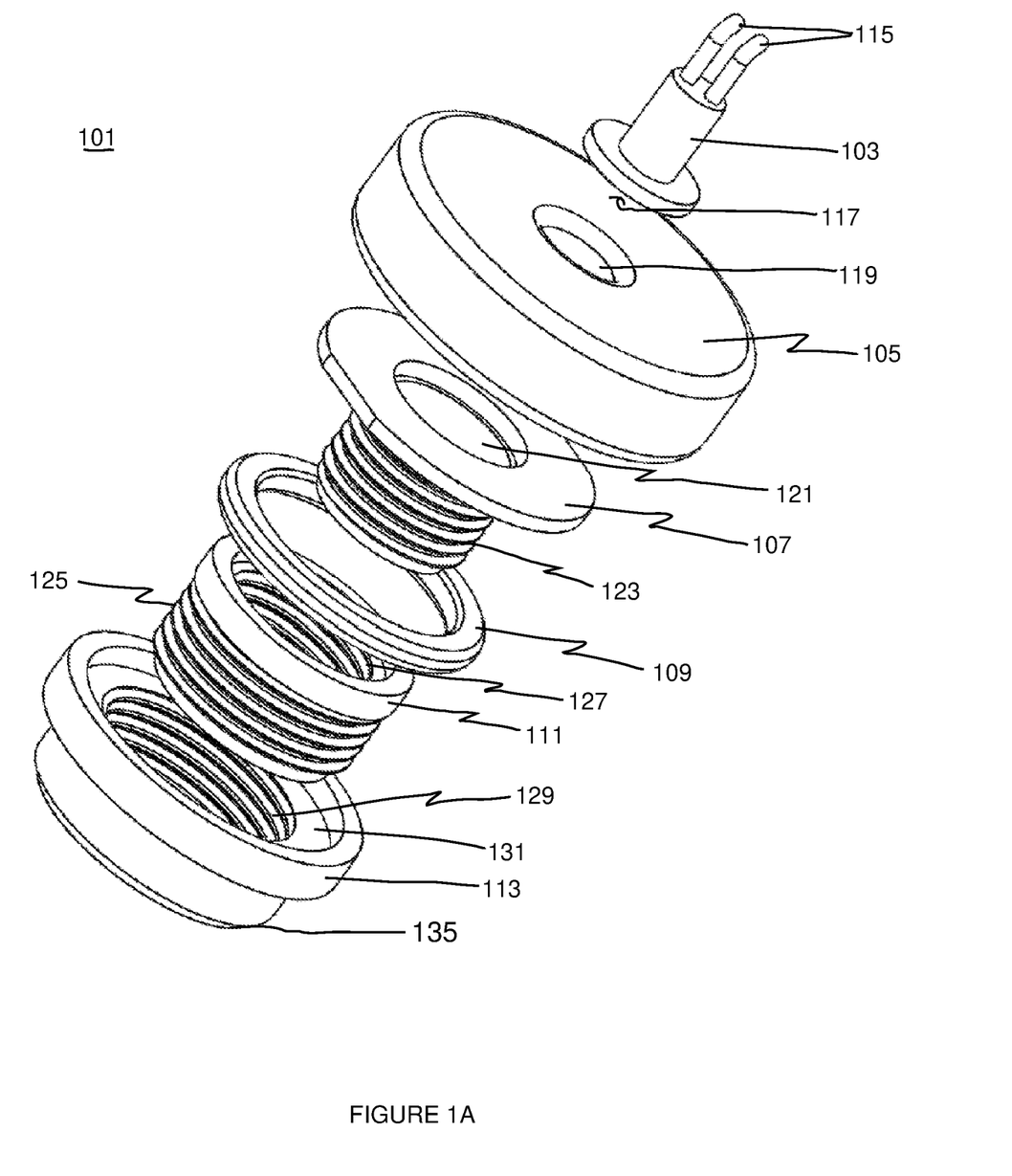
FIG. 1A shows an exploded view of a temperature sensor fitting according to the present disclosure.
Figure 1B:
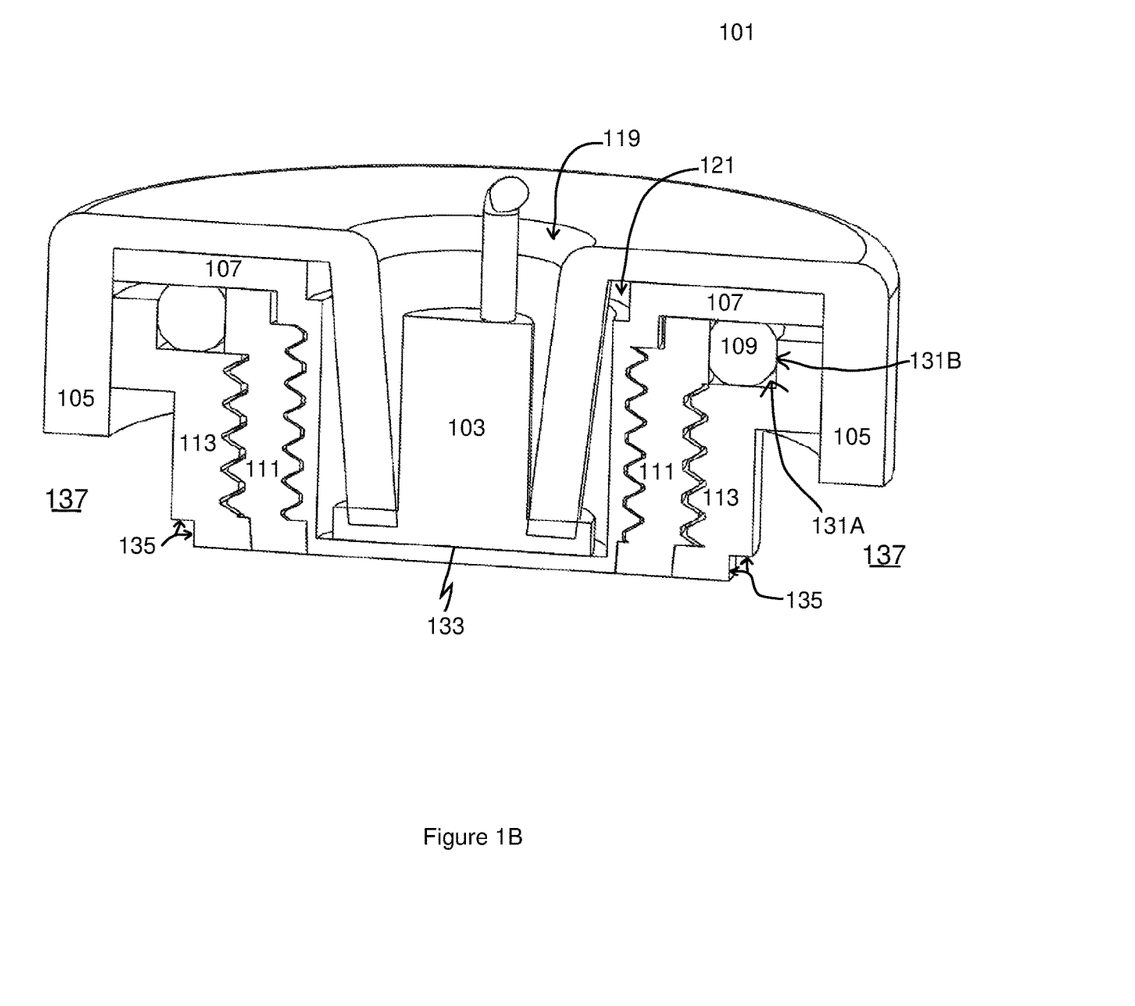
FIG. 1B shows an assembled cross section view of a temperature sensor fitting according to the present disclosure.

FIG. 1A shows an exploded view of a temperature sensor fitting 101 with a temperature sensor 103 that detects temperature of ingredients that are inside a cooking vessel of a kitchen device. FIG. 1B shows an assembled cross section of the temperature sensor fitting 101.

In this embodiment, the temperature sensor fitting 101 may be used in a kitchen device that is a multicooker food processing device. However, it will be understood that the temperature sensor fitting 101 may be used in other suitable kitchen devices that require the temperature of items to be measured, such as a kettle, for example.

In this embodiment, the temperature sensor fitting 101 has an outer secondary seal 105, a threaded temperature sensor cap 107, an O-ring 109, a threaded insulator 111 and a collar 113.

The temperature sensor 103 in this embodiment is an NTC temperature sensor that has two connecting wires (connecting wires 115) and a temperature sensing surface temperature sensing surface 117. The temperature sensing surface is placed in a position inside a cooking vessel so that temperature sensing surface 117 comes in contact with the ingredients being heated by the kitchen device.

It will be understood that other forms of temperature sensor may be used as an alternative. For example, the temperature sensor may be a glass NTC bead.

The outer secondary seal 105 is made from flexible silicon and has a central cavity 119 that allows the connecting wires 115 to pass through and connect to the control circuitry of the kitchen device. In this embodiment, the central cavity 119 is a circular central cavity 119 that is positioned in a central position on the outer secondary seal 105. The central cavity 119 may be any other suitable shape and positioned in any other suitable position. The outer secondary seal 105 also has flexible outer walls that form an annular cavity, where the walls are arranged to flexibly encase the threaded temperature sensor cap 107, O-ring 109, threaded insulator 111 and collar 113 as shown in FIG. 1B.

The threaded temperature sensor cap 107 is made from stainless steel in this embodiment. Other suitable heat conducting materials may be used as an alternative, such as other suitable metals.

An inner surface (133 of FIG. 1B) of the threaded temperature sensor cap 107 is in thermal contact with the temperature sensing surface 117 of the temperature sensor 103 (as shown in FIG. 1B). That is, threaded temperature sensor cap 107 has an inner central cavity 121 that is aligned with the central cavity 119 of the outer secondary seal 105. The inner central cavity 121 allows the temperature sensing surface 117 of the temperature sensor 103 to pass through the inner central cavity 121 and enable the temperature sensing surface 117 to make thermal contact with the inner surface of the threaded temperature sensor cap 107.

An upper circular flange of the threaded temperature sensor cap 107 locates inside the outer secondary seal 105.

A lower extended portion of the threaded temperature sensor cap 107 has an outer threaded portion 123.

The O-ring 109 is arranged to pass around the outer threaded portion 123 of the threaded temperature sensor cap 107 and the upper surface of the O-ring 109 is arranged to abut the lower surface of the upper circular flange of the threaded temperature sensor cap 107.

The threaded insulator 111 in this embodiment is made from PTFE. Any other suitable insulating material may be used as an alternative.

The threaded insulator 111 has an outer threaded portion 125 and an inner threaded portion 127. The inner threaded portion 127 of the threaded insulator 111 corresponds with the outer threaded portion 123 of the threaded temperature sensor cap 107 to enable the outer threaded portion 123 of the threaded temperature sensor cap 107 to be screwed into the inner threaded portion 127 of the threaded insulator 111.

The collar 113 has an inner threaded portion 129 formed in a central cavity of the collar 113. The inner threaded portion 129 of the collar 113 corresponds with the outer threaded portion 125 of the threaded insulator 111 to enable the outer threaded portion 125 of the threaded insulator 111 to be screwed into the inner threaded portion 129 of the collar 113.

The upper portion of the collar 113 has a circular wall that forms a lower sealing surface 131A and a side sealing surface 131B used to seal against the O-ring 109 (as shown in FIG. 1B).

The lower surface of the O-ring 109 is arranged to abut the lower sealing surface 131A and a side surface of the O-ring 109 is arranged to abut the side sealing surface 131B of the collar 113.

Figure 2:
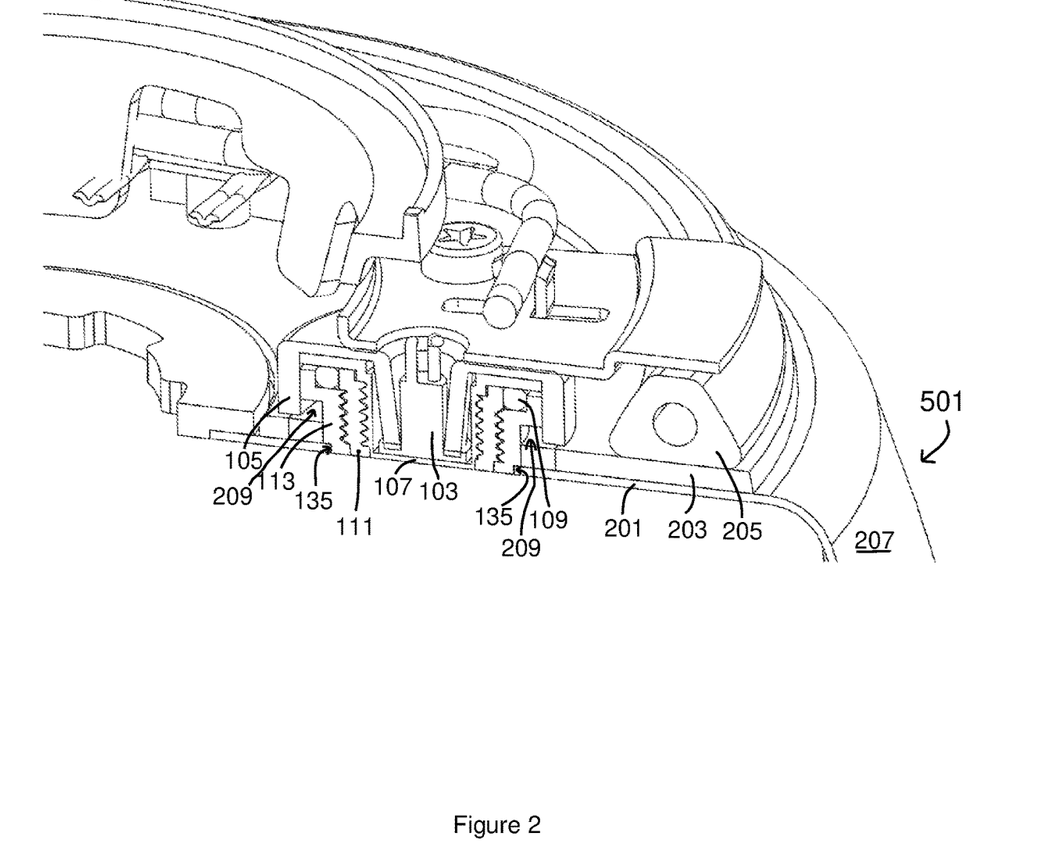
FIG. 2 shows an example of the temperature sensor fitting being used in a heating vessel of a kitchen device according to the present disclosure.

As shown in FIG. 1B, the collar 113 has an outer surface 135 that is formed to correspond with an edge of a vessel floor 201 of a heating plate of a kitchen device, where the heating plate is formed from a heating billet 203 in thermal connection with the vessel floor 201 and a heating element 205 (as shown in FIG. 2).

In this embodiment, the outer surface 135 is an L-shaped step that corresponds with an L-shaped step of the floor 201 of a heating plate as shown in FIG. 2.

The outer surface 135 of the collar 113 is suitable for welding to a corresponding edge of the vessel floor 201. For example, the outer surface 135 may be laser welded to the edge of the vessel floor 201, or by any other suitable welding process. The laser welding provides an air tight pressure seal.

Referring to FIG. 1B, it can be seen that the threaded insulator 111 provides thermal isolation between the temperature sensor 103 and a position indicated by area 137 where a heating plate of the kitchen device is located. That is, the threaded insulator 111 provides a thermal seal between the temperature sensor 103 and the heating plate when the temperature sensor fitting 101 is in use in the kitchen device. Also, the threaded insulator 111 reacts to the thermal expansion and retraction of the threaded temperature sensor cap 107 and collar 113 while maintaining a seal.

FIG. 2 shows an example of a temperature sensor fitting 101 being used in a cooking vessel 207 of a kitchen device 501.

Also shown in FIG. 2 is an area 209 in which a further sealant, such as a silicon adhesive sealant, may be used in case of a reduction in the sealing properties of the weld seal formed at the outer surface 135.

Figure 3:
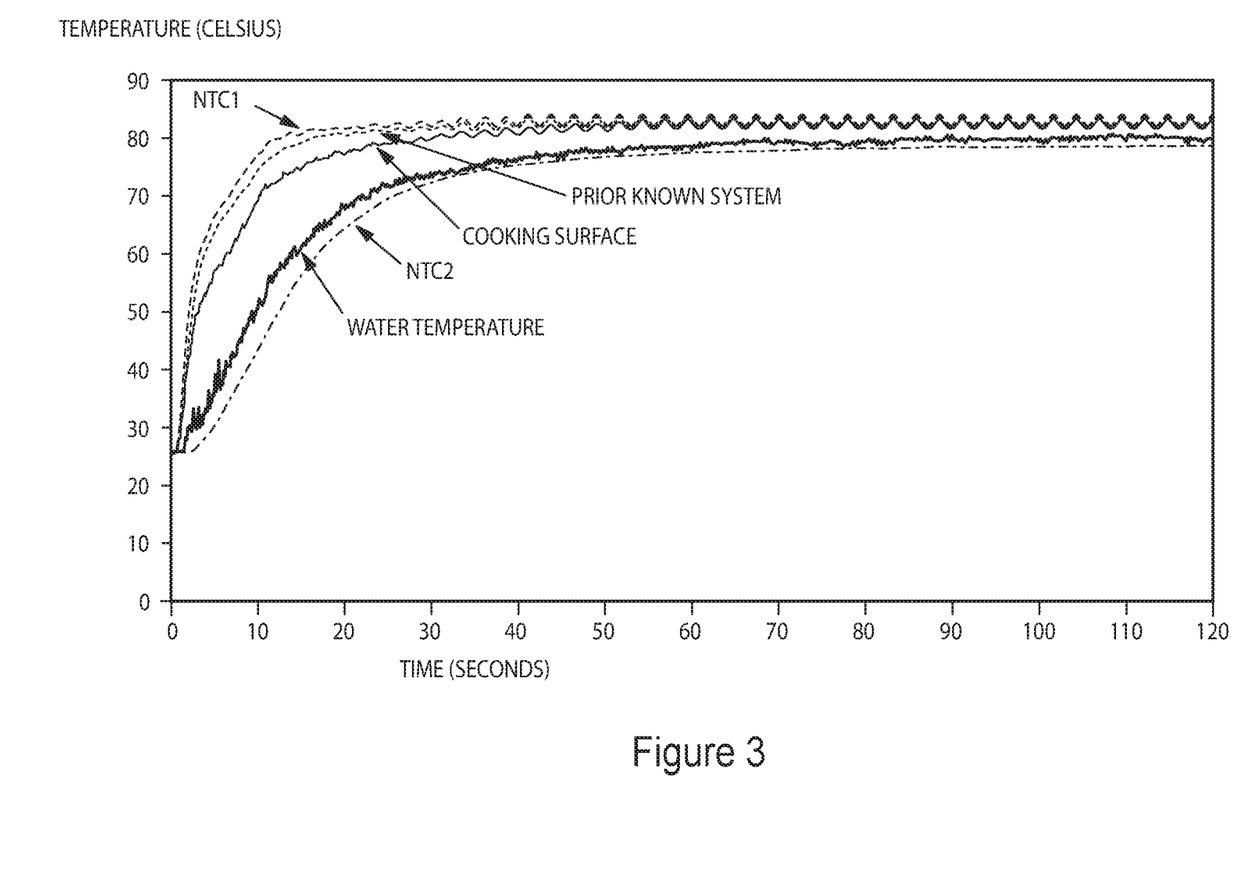
FIG. 3 shows a chart of measured temperature versus time according to the present disclosure.

FIG. 3 shows a chart of measured temperature versus time for various temperature sensor fittings. The chart shows the temperature of the actual cooking surface (i.e. the vessel floor 201) and water (the ingredient) inside the vessel at the water is being heated by the heating plate. The chart shows the temperature measured by a temperature sensor fitting of a prior known system compared to the actual temperature of the water. In the prior known system, the temperature reading is taken from an under side of the cooking surface. The chart also shows the temperature as measured by the temperature sensor (NTC2) of a temperature sensor fitting of an embodiment of the invention. NTC1 is a temperature taken from the heating element of the kitchen device.

It can be seen that the NTC2 temperature reading is much closer to the actual temperature of the ingredient than the prior known system and the cooking surface temperature thus providing an improved temperature sensing system.

Figure 4:
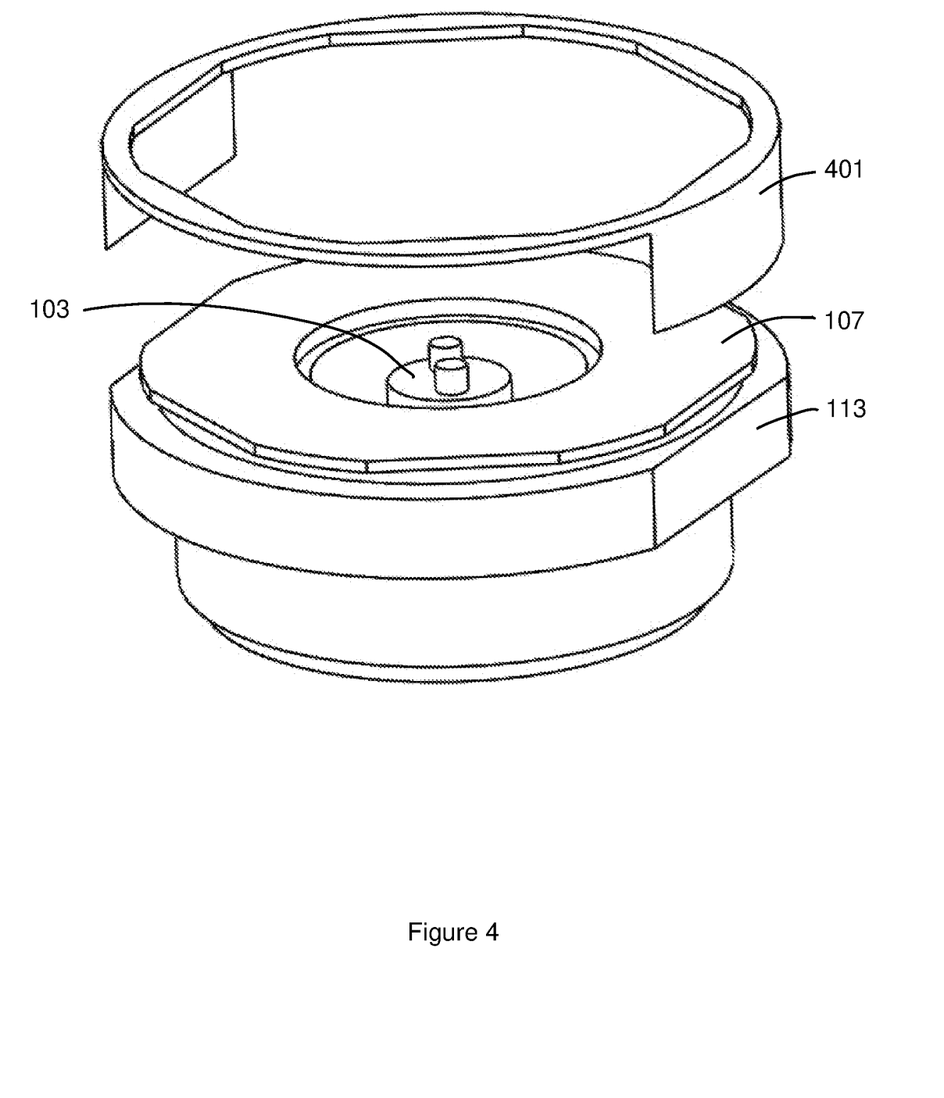
FIG. 4 shows a view of a temperature sensor fitting according to the present disclosure.

FIG. 4 shows a further example of a temperature sensor fitting where a locking collar 401 is used to encase the collar 113, the threaded insulator 111 and the threaded temperature sensor cap 107. Further the locking collar 401 prevents the threaded temperature sensor cap 107 from unscrewing.

Figure 5:
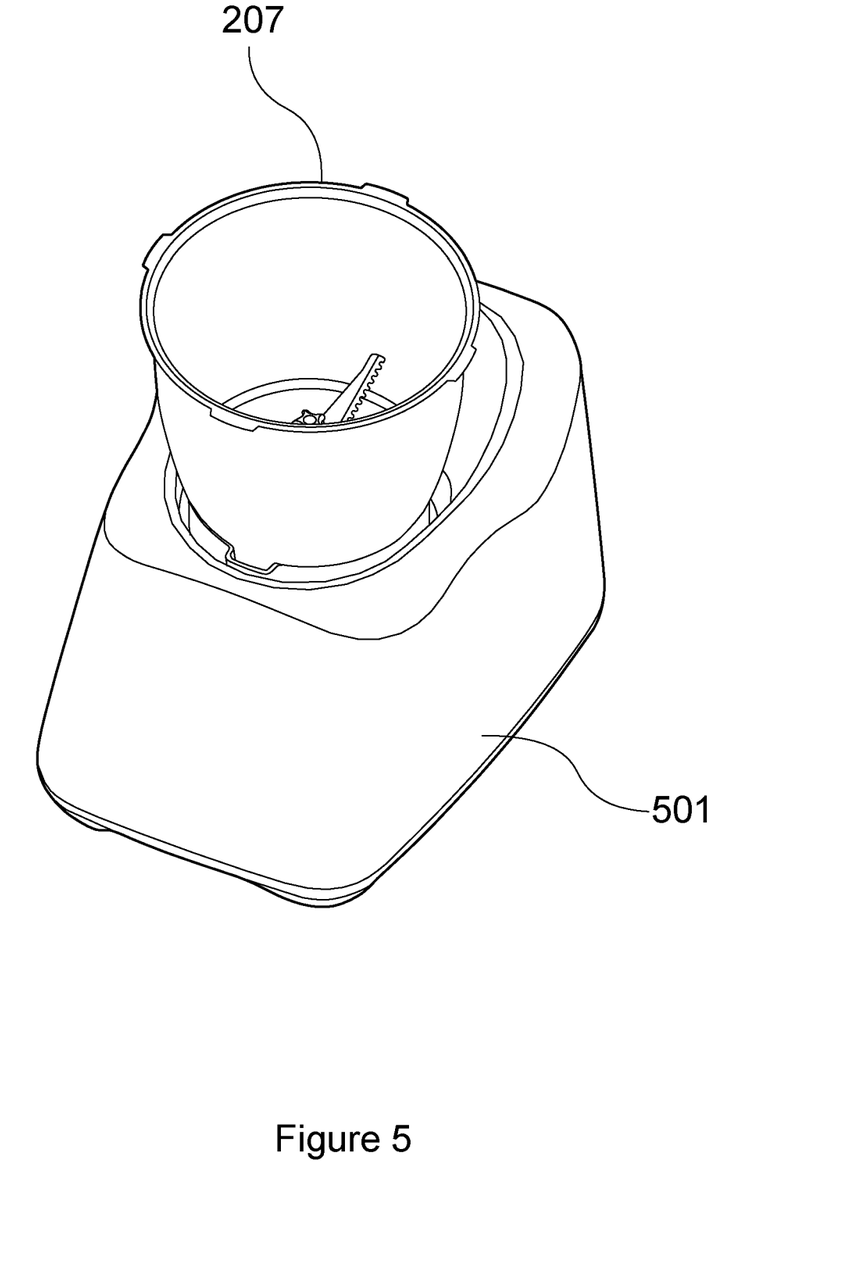
FIG. 5 shows a kitchen device in which the temperature sensor fitting may be fitted according to the present disclosure.

FIG. 5 shows an example of a kitchen device in which the temperature sensor fitting 101 may be fitted.

Figure 6:
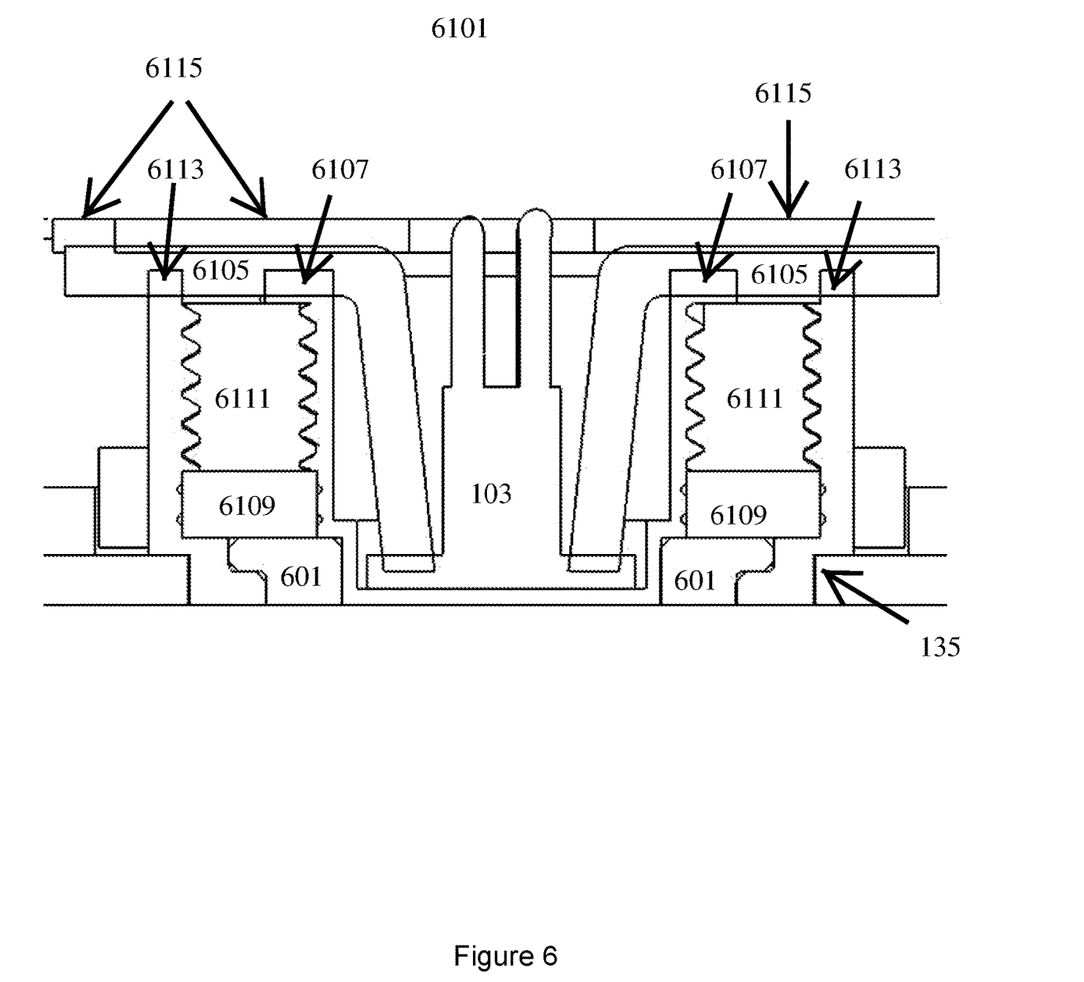
FIG. 6 shows a further example of an assembled cross section view of a temperature sensor fitting according to the present disclosure.

FIG. 6 shows a further embodiment of a temperature sensor fitting 6101. In this embodiment, a seal 6109 is arranged adjacent a lower surface of the PTFE insulator 6111. The seal 6109 is also arranged in between the metal cap 6107 and the collar 6113.

Further, in this embodiment, a PTFE thermal insulator 601 is arranged adjacent the lower surface of the seal 6109. The PTFE thermal insulator 601 is also arranged between the PTFE insulator 6111 and the collar 6113. Optionally, a further sealant, such as Locktite™ for example, may be added to the threads on the metal cap 6107, PTFE insulator 6111 and collar 6113, to apply further pressure to the seal 6109.

Although the silicon seal 6105 shown in FIG. 6 does not have an annular cavity as shown in the silicon seal 105 in FIG. 1B, it will be understood that this may be an option. That is, optionally, the silicon seal may have flexible outer walls that form an annular cavity, where the walls are arranged to flexibly encase the threaded temperature sensor cap 6107, seal 6109, threaded insulator 6111 and collar 6113.

According to this embodiment, a clamp plate 6115 is arranged to clamp down on the silicon seal 6105 to push the silicon seal against the threaded temperature sensor cap 6107 and collar 6113, causing the top ends of the threaded temperature sensor cap 6107 and collar 6113 to be depressed into the silicon seal 6105. It will also be understood that optionally a clamp plate may be used in the arrangement shown in FIGS. 1A and 1B to clamp down on the silicon seal 105.

It will also be appreciated that the locking collar is an option for this embodiment. For example, a locking collar similar to the locking collar 401 in FIG. 4 may be used.

Although the temperature sensor fitting 101 in FIGS. 1A and 1B and 6 is shown with the temperature sensor 103 installed, it will be understood that the temperature sensor fitting 101 may be assembled separate from the temperature sensor 103 and the temperature sensor 103 may be installed later.

It will be understood that the O-ring 109 of the temperature sensor fitting 101 shown in FIG. 1A is an optional seal. For example, the threaded insulator 111 may be formed such that it expands into the cavity in which the O-ring 109 is shown to be located in FIG. 1B, in order to replace the O-ring 109 with the extended portion of the threaded insulator 111. As another example, the cavity in which the O-ring 109 is shown to be located in FIG. 1B may be filled with an alternative seal in the form of an adhesive, or any other suitable sealant.

Further, it will be understood that the outer secondary seal 105 is an optional seal. One example of an alternative arrangement is shown in FIG. 4. A further alternative is to encase the components in any other suitable manner such as by way of the inner and outer threads of the threaded temperature sensor cap 107, threaded insulator 111 and collar 113.

The various arrangements described provide a very high thermal and liquid sealing efficiency as well as more accurate temperature readings of the actual ingredient being heated up.

The weld seal provides an improved liquid seal to reduce the risk of water ingress taking place during use and also when washing the cooking vessel in a dishwasher.

The temperature sensor 103 is isolated thermally from both the vessel floor and the heating plate. The threaded insulator 111 assists with separating the temperature sensor 103 from the heat generated by the vessel floor and the heating plate. The collar 113 weld seal provides a sealing solution for the temperature sensor fitting 101. The threaded temperature sensor cap 107 has a surface that is directly in contact with the ingredients and an opposing surface that is directly in contact with the temperature sensor 103 to enable the temperature sensor 103 to measure the ingredient temperature more accurately. Further, the O-ring 109 has optional additional sealing functionality. Further, the outer secondary seal 105 has optional additional secondary sealing for the temperature sensor fitting 101.

INDUSTRIAL APPLICABILITY

The arrangements described are applicable to the temperature sensor industries and particularly for the food and ingredient processing industries.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

The invention claimed is:

1. A temperature sensor fitting for use with a temperature sensor that detects the temperature of ingredients that are inside a heating vessel of a kitchen device, the temperature sensor fitting comprising:
a collar comprising an inner threaded portion;
a PTFE insulator comprising an outer threaded portion that corresponds with the inner threaded portion of the collar, and further comprises an inner threaded portion;
a metal cap comprising an outer threaded portion that corresponds with the inner threaded portion of the PTFE insulator;
wherein the PTFE insulator provides thermal isolation between a temperature sensor and a heating plate of the kitchen device; and
wherein the collar comprises an outer surface that corresponds with an edge of a floor of a heating vessel of a kitchen device and the outer surface is suitable for welding to the edge of the floor to form a weld seal.

2. The temperature sensor fitting of claim 1, further comprising an outer silicone seal comprising an annular cavity, wherein the annular cavity is arranged to encase the collar, the PTFE insulator and the metal cap.

3. The temperature sensor fitting of claim 1, further comprising an O-ring arranged around the PTFE insulator, and further arranged in between the PTFE insulator and the collar.

4. The temperature sensor fitting of claim 1, further comprising a seal arranged adjacent the PTFE insulator, and further arranged in between the metal cap and the collar.

5. The temperature sensor fitting of claim 4, further comprising a PTFE thermal insulator adjacent the seal, and further arranged between the PTFE insulator and the collar.

6. The temperature sensor fitting of claim 1, further comprising a temperature sensor, wherein the temperature sensor is arranged to be in thermal contact with the metal cap.

7. The temperature sensor fitting of claim 6, wherein the metal cap has an inner surface against which the temperature sensor is in thermal contact and an outer surface that opposes the inner surface, where the outer surface of the metal cap is arranged to be in contact with the ingredients.

8. The temperature sensor fitting of claim 1, further comprising a temperature sensor, wherein the temperature sensor is a glass NTC bead and the glass NTC bead is potted directly onto the metal cap.

9. The temperature sensor fitting of claim 1, wherein the metal cap is made from stainless steel.

10. The temperature sensor fitting of claim 1, wherein the outer surface of the collar is suitable for laser welding to the edge of the floor.

11. The temperature sensor fitting of claim 1, wherein the collar is made from stainless steel.

12. The temperature sensor fitting of claim 1, further comprising a locking collar arranged to prevent the metal cap from unscrewing.

13. The temperature sensor fitting of claim 12, wherein the locking collar is arranged to encase the collar, the PTFE insulator and the metal cap.

14. The temperature sensor fitting of claim 1, further comprising a locking collar arranged to encase the collar, the PTFE insulator and the metal cap.

15. The temperature sensor fitting of claim 1, wherein two or more of the inner or outer threaded portions of the collar, the PTFE insulator and the metal cap are taper lock threads.

16. The temperature sensor fitting of claim 1, further comprising one or more additional sealants between two or more of the threaded portions of the collar, the PTFE insulator and the metal cap.

17. A kitchen device comprising a temperature sensor fitting according to claim 1, wherein the collar of the temperature sensor fitting is laser welded to the edge of the floor of the heating vessel of the kitchen device.

* * * * *

UNITED STATES PATENT AND TRADEMARK OFFICE
CERTIFICATE OF CORRECTION

PATENT NO. : 12,209,914 B2  
APPLICATION NO. : 17/616458  
DATED : January 28, 2025  
INVENTOR(S) : Siu et al.

Page 1 of 1

It is certified that error appears in the above-identified patent and that said Letters Patent is hereby corrected as shown below:

On the Title Page

Item (72) Reads "Con Psarlogos, Alexandria (AU)"  
Should read --Con Psarologos, Alexandria (AU)--

Signed and Sealed this  
Twenty-ninth Day of April, 2025

Coke Morgan Stewart  
*Acting Director of the United States Patent and Trademark Office*